US008009280B1

(12) United States Patent
Erry et al.

(10) Patent No.: US 8,009,280 B1
(45) Date of Patent: Aug. 30, 2011

(54) WAVEFRONT CHARACTERIZATION AND CORRECTION

(76) Inventors: Gavin R. G. Erry, Malvern (GB); Paul Harrison, Rio Rancho, NM (US); Boyd Hunter, Albuquerque, NM (US); Eugene W. Butler, Albuquerque, NM (US)

( * ) Notice: Subject to any disclaimer, the term of this patent is extended or adjusted under 35 U.S.C. 154(b) by 417 days.

(21) Appl. No.: 12/167,945

(22) Filed: Jul. 3, 2008

Related U.S. Application Data

(60) Provisional application No. 60/958,480, filed on Jul. 3, 2007.

(51) Int. Cl.
*G01J 1/00* (2006.01)
(52) U.S. Cl. ........ 356/121; 351/205; 351/214; 356/497; 356/618
(58) Field of Classification Search .......... 351/205–214; 356/121, 479, 497, 665, 618
See application file for complete search history.

(56) References Cited

U.S. PATENT DOCUMENTS

| 6,286,959 | B1 | 9/2001 | Otten |
| 6,331,059 | B1 | 12/2001 | Kudryashov et al. |
| 6,736,507 | B2 | 5/2004 | Kudryashov et al. |
| 7,232,999 | B1 * | 6/2007 | Otten et al. ................. 250/338.1 |
| 7,780,294 | B2 * | 8/2010 | Dai ............................... 351/212 |

* cited by examiner

*Primary Examiner* — Gregory J Toatley
*Assistant Examiner* — Iyabo S Alli
(74) *Attorney, Agent, or Firm* — DeWitt M. Morgan (57) ABSTRACT

A system, for determining characteristics of a beam wavefront and reshaping such wavefront, including: apparatus for sampling the wavefront curvature and generating outputs; apparatus for reshaping the wavefront; and apparatus for receiving the outputs, proportioning the outputs to match the inputs need to drive controls for the reshaping apparatus, and sending the proportioned outputs to the reshaping apparatus. The reshaping apparatus is, preferably, a deformable mirror. The sampling apparatus includes a distorted grating. The method includes: positioning the sampling apparatus in the bean path; positioning a reshaping apparatus in the beam path; sampling the curvature of the wavefront and generating outputs representative of the curvature thereof; sending the generated outputs to the proportioning apparatus; proportioning the outputs to match the inputs needed to drive the controls of the reshaping apparatus; and sending the proportioned outputs to the reshaping apparatus to change the shape thereof.

18 Claims, 11 Drawing Sheets

WAVEFRONT CHARACTERIZATION AND CORRECTION

RELATED U.S. APPLICATION DATA

This application is a continuation-in-part of and claims the priority of provisional application Ser. No. 60/958,480, filed Jul. 3, 2007.

FIELD OF THE INVENTION

This invention relates, in general, to wavefront characterization and correction. More particularly, the present invention relates to a method (and the associated apparatus) including the steps: of sampling the curvature of a wavefront with a curvature sampling device; generating outputs representative of the curvature of the wavefront; sending the generated outputs to a proportioning device; and proportioning the outputs from the curvature sampling device to match the inputs needed to drive the controls of a wavefront reshaping device. The invention also relates to apparatus and methods for determining at least some of the characteristics of the wavefront of a beam without the use of an artificially generated reference.

BACKGROUND OF THE INVENTION

U.S. Pat. No. 6,286,959 B1 (the "'959 Patent"), assigned to the assignee of this application, discloses wavefront sensing using a distorted grating to determine the characteristics of a wavefront that has passed through a cornea (either in vitro or in vivo). More specifically, this patent relates to the use of wavefront sensing using a distorted grating to identify corneas that have been surgically modified. The apparatus includes a distorted grating and an imaging lens which have a pupil plane, first and second virtual planes and an image plane.

With reference to FIG. 1 of the '959 Patent, apparatus 11 for determining the characteristics of a wavefront includes a source of light 13, a distorted grating (sometimes referred to as a "distorted diffraction grating") 17, a high quality imaging lens (or lens set) 19, and a detector 21 (either film or electronic) having a detector plane 23. Grating 17, lens 19 and detector 21 are sometimes referred to as wavefront sensor 24. Apparatus 11 also includes a beam path 25, a pupil plane 27, first virtual plane 29, second virtual plane 31, and a data processor 33. Data processor 33, connected to detector 21 via a data acquisition device such as a frame grabber (not shown), stores the images from detector 21 and determines the wavefront from the stored images. The representation of the virtual planes between source 13 and sensor 24 is for convenience only.

With grating 17 in close proximity to lens 19 (typically these two elements would, in fact, be in contact with each other along beam path 25), the 0, +1 and −1 diffraction orders of grating 17, image pupil plane 27, virtual object plane 29 and virtual object plane 31 are projected onto detector plane 23. The higher order diffraction orders are cut off by an appropriately placed field stop (not shown) so as not to contaminate the image of the 0 and +1 and −1 orders. Further, with the zero order being an image of the pupil plane 27, the images in the +1 and −1 diffraction orders correspond to virtual image planes equidistant from and an opposite sides of pupil plane 27. The grating is distorted according to, $$\Delta_x(x, y) = \frac{W_{20}d}{\lambda R^2}(x^2 + y^2)$$

where $\lambda$ is the optical wavelength, x and y are Cartesian co-ordinates with an origin on the optical axis and R is the radius of the grating aperture which is centered on the optical axis. The parameter $W_{20}$, defines the defocusing power of the grating, and is the standard coefficient of the defocus equivalent on the extra pathlength introduced at the edge of the aperture, in this case for the wavefront diffracted into the +1 order. The phase change $(\emptyset_m)$ imposed on the wavefront diffracted into each order m is given by, $$\varphi_m(x, y) = m\frac{2\pi W_{20}}{\lambda R^2}(x^2 + y^2)$$

With nothing in pupil plane 27 of apparatus 11 (e.g., cornea container 15 removed) and source 13 present, the images recorded on detector plane 23 are as illustrated in FIG. 1B of the '959 Patent.

While the '959 Patent discloses a sensor, it does not disclose any method or apparatus for correcting the wavefront of a beam.

U.S. Pat. No. 7,232,999 B1 (the "999 Patent") and pending U.S. patent application Ser. No. 11/820,651 filed Jun. 19, 2007 (which claims the priority of the '999 Patent), both assigned to the assignee of this application and incorporated by reference, disclose the use of distorted grating based wavefront sensors to measure wavefronts of radiation. More particularly, in the preferred embodiment the invention disclosed therein involves positioning a beam of light containing the wavefront to be characterized onto a distorted grating, using the grating to produce a plurality of images, determining the infrared wavefront from the plurality of images and analyzing the wavefront for features that characterize the infrared wavefront.

With reference to FIG. 7 of the '999 Patent wavefront 101 to be measured is directed onto pupil plane 103, the wavefront at pupil plane 103 is then redirected onto grating 105, modifying wavefront 101, which modified wavefront is subsequently focused onto detector 107 through lens 109. Grating 105, lens 109 and detector 107 constitute the wavefront sensor. Optional pupil relay and magnification optics 115 can be used to orient and resize wavefront 101 as required by the application being used.

With reference to FIG. 8 of the '999 Patent, laser 121 generates light beam 123 which is passed through attenuator 125 and is re-directed using optics 127 and 129. Mirrors 131 and 133 are used to disperse and re-collimate beam 123 which is then directed through aperture 135 (collimation is not required). It is the wavefront as it exists at aperture 135 that will ultimately be imaged onto detector 145. Beam 123 is subsequently directed through lenses 137 and 139 which are used to position and magnify beam 123. Beam 123 is then passed through diffraction grating 141 before being focused by lens 143 onto the focal plane of detector (infrared camera) 145. Lens 143 serves to focus the beam 123 as modified by grating 141 onto a detector 145. Grating 141, lens 143 and detector 145 constitute the wavefront sensor.

The '999 Patent does not, however, disclose either a method or apparatus for: (1) correcting the output beam of a laser; or (2) correcting the image of an object prior to detecting such image.

Some of the most widely known work in the field of adaptive optics has been done for astronomical purposes; attempting to correct atmospheric turbulence to allow telescopes at low altitudes to perform as well as high-altitude telescopes (e.g. Mauna Kea at 14,000 feet elevation) or, better yet, like space based telescopes. Most adaptive optics systems use a Shack-Hartmann wavefront sensor, which requires a point source as its reference as, basically, a Shack-Hartmann sensor calculates the centroid of an image of the reference, which requires that reference is small and well defined. Alternatively, some astronomical adaptive optics systems use a wavefront sensing technique called phase diversity, which takes two defocused images of the reference and so, again, relies on the reference being small and well defined.

Ideally, in order to correct the image, wavefront measurements are made on a perfect source that has propagated along the same path as the image. This way correcting the wavefront of the ideal source simultaneously corrects imaging through optics looking along the same path. The problem is finding a perfect wavefront source to measure. For astronomy, a star can be used as the reference (as it is small and well defined). However, it also has to be bright which severely limits the regions of the sky that can be observed (astronomical telescopes typically have a very small field of view and so the chances of a bright star being within the field of view of the object which an astronomer wants to observe is very small). A solution to this problem is to use a laser to create a bright virtual star (an ideal reference) by exciting sodium atoms in the upper atmosphere. This artificially generated reference is typically called a "guide star".

This same basic technique (projecting a laser beam through the optical system, measuring and correcting the return beam and, hence, correcting the imaging performance of the system) has been adapted to other, non-astronomical applications (e.g. enhanced retinal imaging). U.S. Pat. No. 6,331,059 B1 (the "'059 Patent"), discloses an improved fundus retinal imaging system in which a conventional fundus retinal imager is combined with a multispectral source, a dithered reference, a wavefront sensor, a deformable mirror and a high resolution camera. More specifically, the '059 Patent discloses an ophthalmic instrument having a wide field of view (up to 20 degrees) including a retinal imager, (which includes optics for illuminating and imaging the retina of the eye); apparatus for generating a reference beam coupled to the imager optics for measuring the wavefront produced by optical aberrations within the eye and the imager optics; wavefront compensation optics coupled to the imager optics for correcting large, low order aberrations in the wavefront; a high resolution detector optically coupled to the imager optics and the wavefront compensation optics; and a computer (which is connected to the wavefront sensor, the wavefront compensation optics, and the high resolution camera), including an algorithm for correcting small, high order aberrations on the wavefront and residual low order aberrations. The wavefront sensor includes a Shack-Hartmann wavefront sensor having a lenslet array and a detector positioned in the front surface of the lenslet array for producing a Hartmannogram. See, generally, FIG. 1 of this reference.

U.S. Pat. No. 6,736,507 B2 (the "'507 Patent), which is a continuation-in-part of the '059 Patent, discloses the use of a distorted grating wavefront sensor as an alternative to the Shack-Hartmann wavefront sensor. See, col. 3, ll. 18-21 and col. 5, ll. 15-27. However, regardless of which sensor is used, all the other optics and electronics remain the same. Also, overall the methodology remains unchanged. Thus, for instance, the apparatus for generating a reference beam coupled to the image optics to form a reference area on the retina is used with both the Shack-Hartmann wavefront sensor and the distorted grating sensor.

All of the foregoing adaptive optics systems, including the systems described in the '059 and '507 Patents, include wavefront characterization and correction. Further, all include the following steps (and the associated apparatus for accomplishing such steps): (a) acquiring data from the wavefront to be characterized and corrected; (b) using the acquired data to mathematically reconstruct the wavefront; (c) from the reconstructed wavefront computing either the slope or the curvature of such wavefront (depending on what type of data is needed to drive the mirror used to correct the wavefront); (d) using the slope (or curvature) data to generate signals to drive the mirror; and (e) driving the mirror to correct the wavefront. In the case of adaptive optics imaging systems, an artificially generated reference (e.g., guide star) is also necessary, in which case step (a) becomes: acquiring data from the wavefront of the artificially generated reference.

Figure 1:
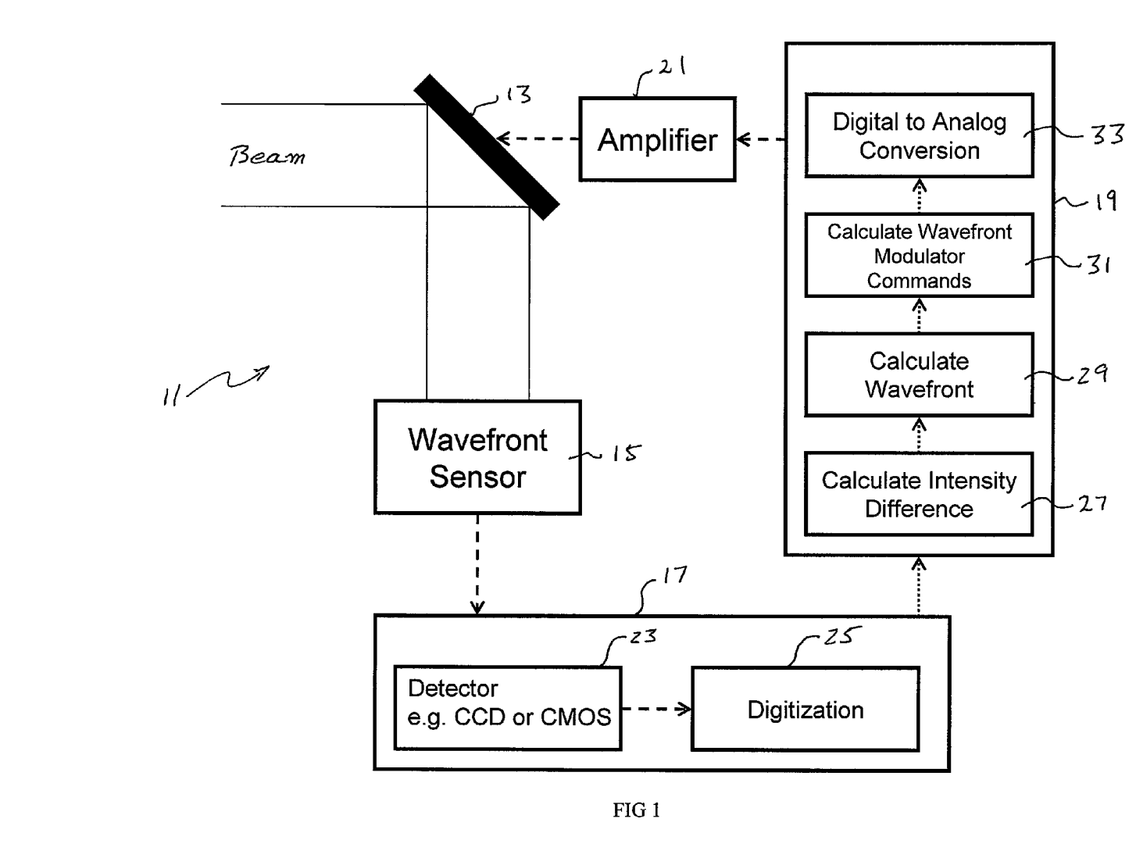
FIG. 1 is a schematic representation (part optical, part electronic) of a prior art adaptive optics system.

The foregoing, without the artificially generated reference, is schematically illustrated in FIG. 1, in which adaptive optics system 11 includes wavefront modulator 13, wavefront sensor 15, data acquisition device 17, prior art processor 19 and amplifier 21. Wavefront modulator 13 would, typically, be a deformable mirror (which includes actuators); sensor 15, a Shack-Hartman sensor. As illustrated, data acquisition device 17 includes a detector 23 (e.g., CCD (Charged Coupled Device) or CMOS (Complementary Metal Oxide Semi-conductor)) and a mechanism (e.g., routine or hardware) 25 for digitizing the images captured by detector 23. Processor 19 includes computer routine 27 for processing the raw digital data from converter 25 into information utilized by the analysis technique associated with the data acquisition device 17 (e.g., a Shack-Hartman sensor or a distorted grating wavefront sensor). Processor 19 also includes a routine 29 for mathematically recreating the detected wavefront, and a routine 31 for calculating the slope or the curvature of the created wavefront (sometimes referred to as wavefront modulator commands), depending on what type of data is needed to drive wavefront modulator 13. Finally, processor 19 includes a routine 33 for converting the digital information from routine 31 to analog. Amplifier 21 provides the power to drive the actuators of deformable mirror 13. Variations of the foregoing include incorporating detector 23 into wavefront sensor 15. Converter 25 can be part of data acquisition device 17, incorporated into processor 19 or a stand alone device. Amplifier 21 can be a separate device as illustrated, or combined with wavefront modulator 13.

Figure 2:
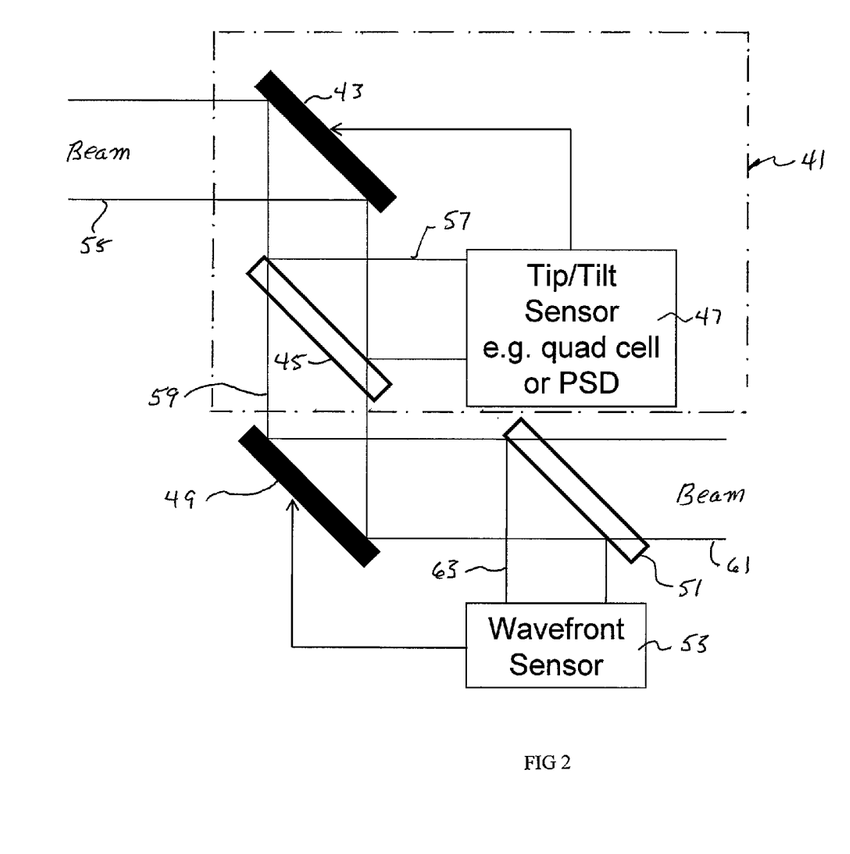
FIG. 2 is a schematic representation (again part optical and part electronic) of the separate tip/tilt and wavefront sensor loops required in prior art adaptive optics systems.

In addition to a deformable mirror, adaptive optics systems may include a mechanism of correcting the tip/tilt of the beam (sometimes also referred to as removing jitter). With reference to FIG. 2, tip/tilt correction system 41 includes tip/tilt mirror 43, beam splitter 45 and tip/tilt sensor 47 (e.g., a quad cell or a position sensitive detector (or PSD)). The adaptive optics system also includes wavefront modulator 49, beam splitter 51 and wavefront sensor 53. Beam splitter 45 divides beam 55 into portion 57 which is directed to sensor 47 and portion 59 which is directed onto wavefront modulator 49. Similarly, beam splitter 51 divides beam portion 59 into two portions, 61 and 63, the latter of which is directed to wavefront sensor 53. Wavefront sensor 53, via processor 19 (shown only in FIG. 1), controls wavefront modulator 49 in the manner described above with regard to FIG. 1. However, as is evident from FIG. 2, the control loop for tip/tilt mirror 43 is, and has to be, separate from the control loop for wavefront modulator 49.

The foregoing adaptive optics systems have the following disadvantages: (a) they require a routine for mathematically reconstructing the measured wavefront, which routine is computationally intensive; (b) they require a routine for determining the slope (or the curvature) of the reconstructed wavefront, which routine is also computationally intensive; (c) when used for imaging they require the use of an artificially generated reference (e.g., a guide star); and (d) they require a separate data collection/control loop for a tip/tilt correction device.

OBJECTS OF THE INVENTION

It is an object of the present invention to provide an adaptive optics system that, in comparison to existing adaptive optics systems, is simpler to construct, more rugged, computationally less intensive and hence faster, and cheaper.

It is a further object of the present invention to provide an adaptive optics system that makes a measurement of the curvature of the beam (e.g., the image beam) and then uses that measurement to drive, through the use of a "proportioning" mechanism, a beam correction device (e.g., a deformable mirror) that provides a curvature correction to the wavefront of the beam. As used in this application, the term "proportioning" means a device, mechanism or routine (and the associated use of such device, mechanism or routine) which matches the signals from the device that measures the curvature of the beam to the signals needed to drive the curvature correction device: (a) without the need to create a wavefront from the signals acquired from the device that measures the curvature of the beam; and (b) without the need to compute either the slope or the curvature of the wavefront.

It is a further object of the present invention to, with the use of a distorted grating wavefront sensor, use a feature in the beam to be corrected to determine at least some of the characteristics of the associated wavefront. This removes the requirement for an artificially generated reference (sometimes referred to as a guide star) and allows a fundamental paradigm shift in the design of the wavefront sensing system. There is no known adaptive optics imaging systems constructed or proposed around any method other than the artificially generated reference method.

Other objects and advantages will be apparent from the description of the preferred embodiments.

SUMMARY OF THE INVENTION

The present invention relates to a system for determining at least some of the characteristics of the wavefront of a beam and, using such determined characteristics, to at least partially reshape such wavefront. The system includes apparatus, positioned in the beam path, for sampling the curvature of the wavefront and for generating outputs. The system also includes apparatus (including controls responsive to inputs), positioned in the beam path, for at least partially reshaping the wavefront. The system further includes apparatus, connected to the curvature sampling apparatus and to the wavefront reshaping apparatus, for (a) receiving the outputs from the curvature sampling apparatus, (b) proportioning the outputs from the curvature sampling apparatus to match the inputs need to drive the controls of the wavefront reshaping apparatus, and (c) sending the proportioned outputs to the wavefront reshaping apparatus to change the shape of the wavefront reshaping apparatus.

The wavefront reshaping apparatus is, preferably, a deformable mirror which includes a surface obeying the surface equation $\nabla^2 S = aV$, wherein "S" is the surface shape of the deformable mirror, "a" is a constant, "V" are the signals (voltage or current) applied to the controls of the deformable mirror, and $\nabla^2 S$ is the rate of change in slope of the surface of the deformable mirror.

The curvature sampling apparatus is a wavefront sensor including a distorted grating and an associated detector. The distorted grating produces at least first and second images of the wavefront; the detector captures such images and produces the outputs (which outputs are analog outputs). In one version the detector is selected from the group including CCDs and CMOSs. Alternately, the detector is an array of photo-detectors, wherein the number of photo-detectors is proportional to the number of controls on the wavefront reshaping apparatus. As the curvature sampling apparatus determines at least some of the characteristics of the wavefront from features present in the wavefront itself there is no need for the artificially generated reference necessary in prior art adaptive optics imaging systems.

The proportioning portion of the receiving/proportioning/sending apparatus determines the difference between the intensities of the images of the +1 and −1 diffraction orders of the distorted grating.

The system further includes apparatus to adjust the tip/tilt of the beam.

The operation of the above described system includes the steps of: (a) positioning the curvature sampling apparatus that generates outputs in the path of the beam; (b) positioning a wavefront reshaping apparatus in the path of the beam; (c) sampling the curvature of the wavefront with the curvature sampling apparatus and generating outputs representative of the curvature of the wavefront; (d) sending the generated outputs to the proportioning device; (e) proportioning the outputs from the curvature sampling apparatus to match the inputs needed to drive the controls of the wavefront reshaping apparatus; and (f) sending the proportioned outputs to the wavefront reshaping apparatus to change the shape of the wavefront reshaping apparatus and, hence, the wavefront. Because the characteristics of the wavefront are determined from features present in the wavefront itself, the prior art step of artificially generating a reference is avoided.

DESCRIPTION OF THE PREFERRED EMBODIMENTS

Figure 3:
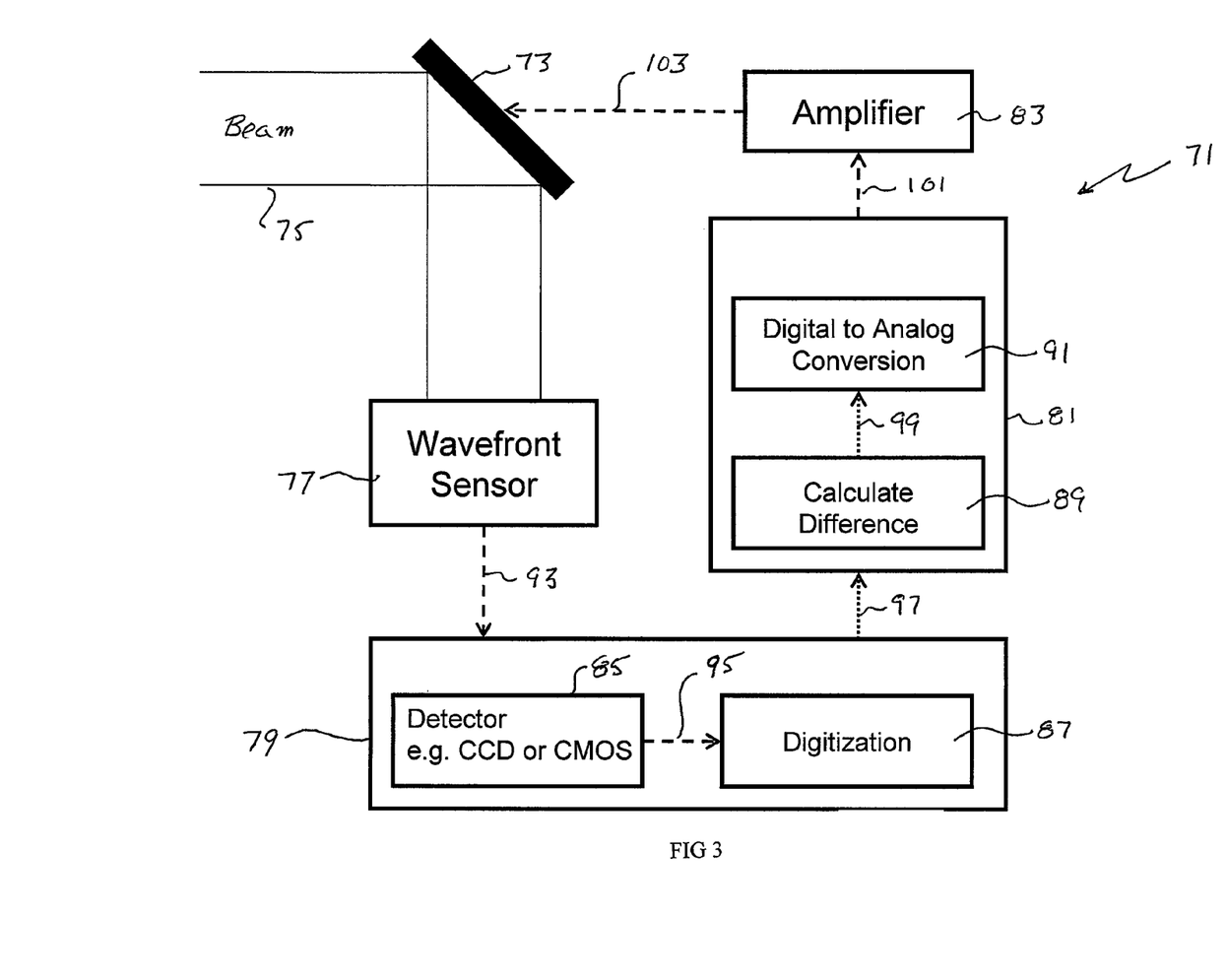
FIG. 3 is a partially optical/partially electronic schematic representation on an embodiment of the present invention.

With reference to FIG. 3, adaptive optical system 71 includes a wavefront modulator 73 for reshaping the wavefront of beam 75. System 71 also includes wavefront sensor 77, data acquisition device 79, processor 81 and amplifier 83. Wavefront modulator 73 is, in the preferred embodiment, a deformable mirror (which includes actuators); sensor 77, a distorted grating wavefront sensor. As illustrated, data acquisition device 79 includes a detector 85 (e.g., a CCD or a CMOS) and a mechanism (e.g., a routine or hardware) 87 for digitizing the images captured by detector 85. Processor 81, in sharp contrast with the prior art, includes a routine 89 for processing the raw digital data from converter 87 and a digital to analog conversion routine 91. Variations of the foregoing include incorporating detector 85 into wavefront sensor 77. Further, converter 87 can be part of data acquisition device 79, incorporated into processor 81 or be a stand alone device. Amplifier 83 can be a separate device, as illustrated, or combined with wavefront modulator 73.

In a distorted grating wavefront sensor, with the distorted grating in close proximity to a lens (typically these two would be in contact with each other along the beam path), the images of the 0, +1 and −1 diffraction orders of the grating will be projected onto the plane of detector 85. An example is illustrated in FIG. 2 of the '999 Patent. Other orders (e.g., +2, −2) can be cut off by an appropriately placed field stop (not shown). Routine 89 takes the images of the +1 and −1 diffraction orders and determines the differences in the intensities between these two images. In contrast to the prior art, processor 81 does not include either a routine for mathematically recreating the wavefront or a routine for calculating either the slope (or curvature) of any wavefront. Thus, in operation, the wavefront of beam 75 is measured by sensor 77 and analog signals 93 sent to detector 85. The analog signals 95 from this detector are then digitized by converter 87 and the resulting digital signals 97 sent to routine 89 which, in turn, sends digital signals 99 to analog conversion routine 91. Analog signals 101 are then sent to amplifier 83 which provides the power to dive the actuators of the deformable mirror.

While the embodiment of FIG. 3 has considerable advantages over prior art adaptive optics systems in that it eliminates the need for both routines 29 and 31, as identified above with regard to the discussion of FIG. 1, it can be further simplified. A more efficient technique is possible if the deformable mirror is constructed in a certain manner, an obeys the surface equation $\nabla^2 S = aV$.

Recalling that the intensity transport equation is:

$$\nabla^2 \phi = -k \frac{\partial I}{\partial z}$$

A mirror control equation for a deformable mirror is:

$$\nabla^2 S = aV$$

If we require that:

$$\phi = S$$

then the uniqueness theorem states that:

$$\nabla^2 \phi \nabla^2 S$$

Substituting and rearranging for V $$aV = \nabla^2 S = \nabla^2 \phi = -k \frac{\partial I}{\partial z}$$

$$V = -\frac{k}{a} \frac{\partial I}{\partial z}$$

Where:
S is the surface shape of the deformable mirror;
a is a constant;
V are the signals (typically voltages; alternately currents) applied to the electrodes of the deformable mirror;
φ is the shape of the wavefront;
k is a constant; and $$\frac{\partial I}{\partial z}$$

is the intensity gradient of the light along the direction of propagation.

As is evident from the foregoing, V is a linear function of the difference in intensity of the two wavefront sensor images. This offers a unique optimal signal that can serve as the error signal in a closed loop system along with being able to be directly mapped onto the deformable mirror. This processing scheme has been verified experimentally.

Rather than performing these calculations in a digital computer, it is possible to construct an analog system, using an array of photo-detectors, and an analog computer scheme to calculate the signals (e.g., voltages) to output to the deformable mirror. The advantage of such a system will be the bandwidth can be in the MHz correction frequency using inexpensive components, as opposed to the kHz correction frequency achieved by expensive digital systems.

Figure 4:
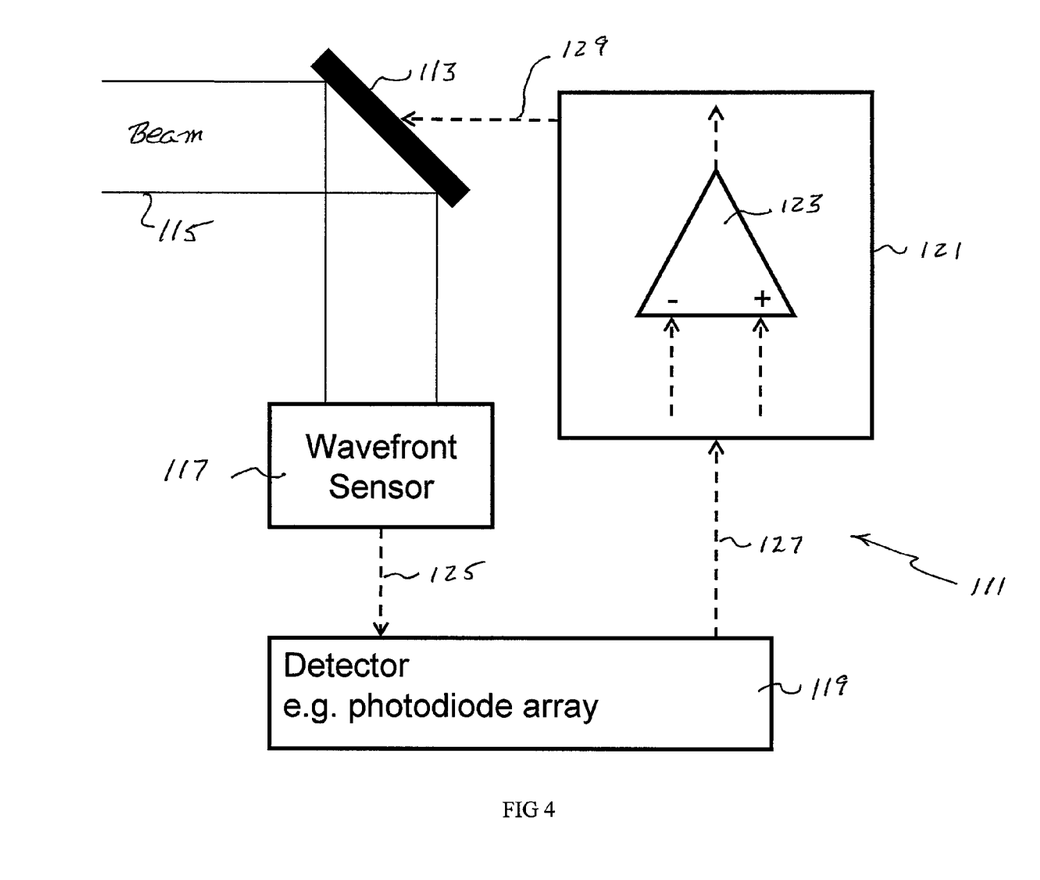
FIG. 4 is a partially optical/partially electronic schematic representation of an alternative embodiment of the present invention which is analog only.

With reference to FIG. 4, analog only system 111 is illustrated which includes a wavefront modulator 113, for reshaping the wavefront of beam 115, and wavefront sensor 117. Modulator 113 and sensor 117 are the same as described in reference to the system illustrated in FIG. 3. However, in place of data acquisition device 79, detector 119 is an array of photodiodes. Further, processor 121 is now an array of differential op-amps 123, which eliminates the need for a separate amplifier 83 as illustrated in FIG. 3.

As is also evident from inspection from FIG. 4, the signals 125 from sensor 117 to photodiode array 119 is analog, as are signals 127 and 129. In operation op-amps 123 put out a signal proportional to the difference in the inputs from the photodiodes of detector 119.

Figure 5:
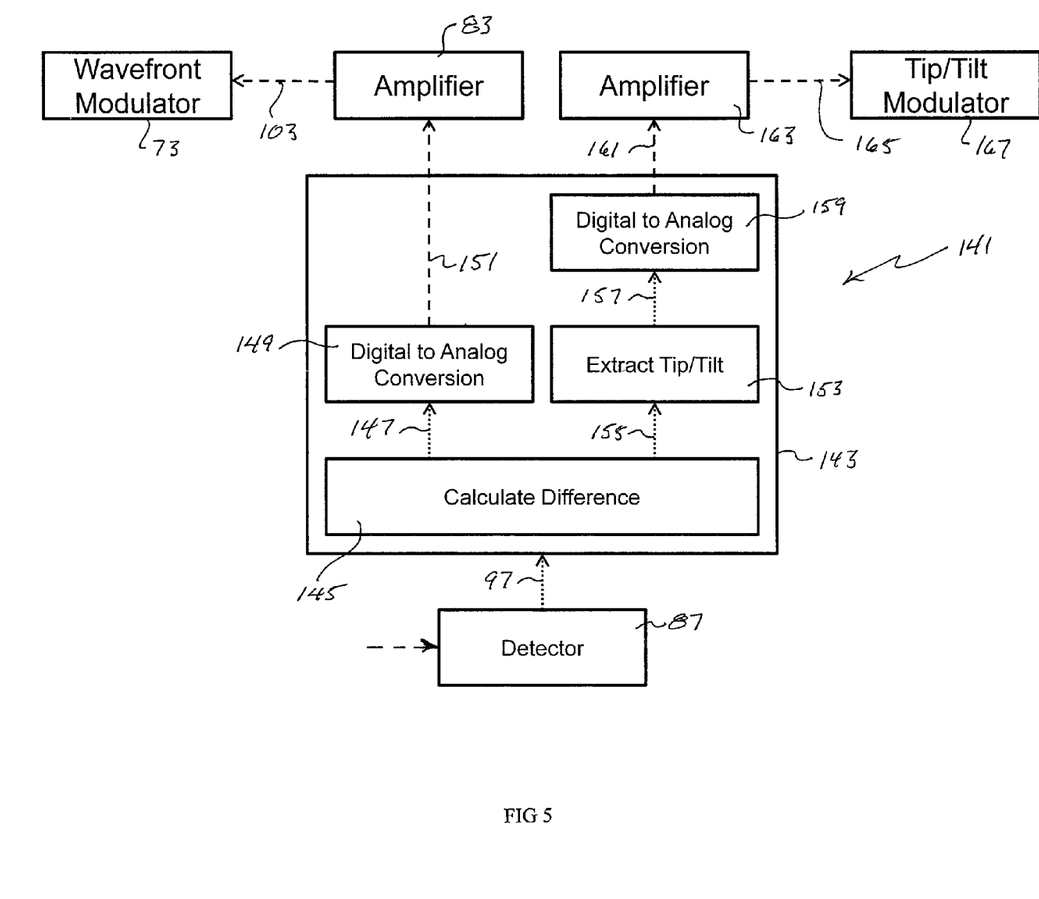
FIG. 5 is a partial schematic illustrating the addition of tip/tilt correction to the embodiment of FIG. 3.

A tip/tilt correction system may be incorporated into the system illustrated in FIG. 3. With reference to FIG. 5, tip/tilt correction system 141 includes wavefront modulator 73, routine 87 and amplifier 83, all as previously described. Thus, the beam (not shown) is sensed by wavefront sensor 77 which sends analog signals to data acquisition device (not shown) which, in the manner previously described, sends digital signals 97 to processor 143. Processor 143 (like processor 81) includes a routine 145, which functions in the same manner as routine 89 to determine the differences between the images of the +1 and −1 diffraction orders and sends digital signals 147 to digital to analog conversion routine 149 (which functions in the same manner as digital to analog conversion routine 91). Further, as with the embodiment of FIG. 3, routine 149 sends analog signals 151 to amplifier 83, which via analog connection 103 provides the power to drive the actuators of the deformable mirror. In addition, processor 143 includes a routine 153 to extract from digital signals 155 tip/tilt data from the images of the +1 and −1 diffraction orders by, for instance, tracking the motion of the images. Tip/tilt routine 153 sends digital signals 157 to digital to analog conversion routine 159 which, in turn, sends analog signals 161 to amplifier 163. Amplifier 163 sends analog signals 165 to tip/tilt modulator 167 to power the associated actuators (not shown) to move tip/tilt modulator 167 to remove jitter from the beam.

Figure 6:
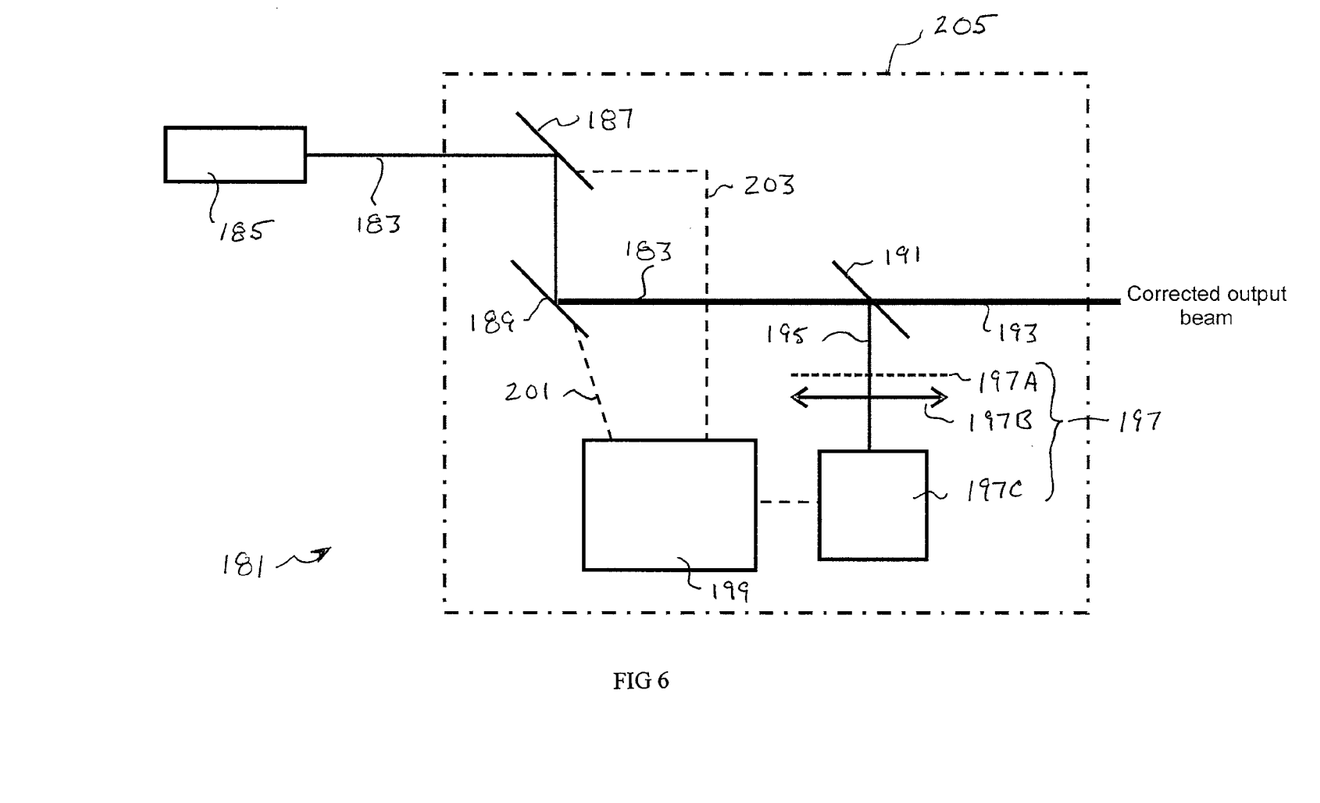
FIG. 6 shows, schematically, the use of the adaptive imaging system of the present invention for the correction of a laser beam.

With reference to instrument 181 in FIG. 6, laser beam 183 from source 185 is reflected off a tip/tilt correction mirror 187 for removing the tip/tilt (jitter) from the beam. The beam 183 then reflects off deformable mirror 189 for reshaping the wavefront of the beam to remove unwanted aberrations, or add wanted wavefront shapes. Beam 183 is then split by beam splitter 191 into two beams: beam 193 which is the output of system 181; and beam 195 which is sampled by wavefront sensor 197. Wavefront sensor 197 consists of grating 197A, lens 197B and detector 197C. The incorporation of detector 197C in wavefront sensor, as opposed to data acquisition device 79 of system 71 (FIG. 3), is a matter of design choice. Processor 199 is, in one preferred embodiment, the same as processor 81, except that it includes a routine or hardware that functions in the same manner as mechanism 87. Again, the location of mechanism 87 is a matter of design choice, so long as the functionality remains unchanged. The analog output 201, which is the same as analog output 101, is sent to an amplifier (not shown) which, in turn, drives the actuators (also not shown) of deformable mirror 189. As instrument 181 includes tip/tilt mirror 187, it also includes a tip/tilt correction system such as illustrated in FIG. 5, to send analog signals 203 to an amplifier (not shown) which, in turn, drives the actuators (also not shown) associated with tip/tilt mirror 187. Alternately, the analog system described in reference to FIG. 4 can be utilized. For convenience in describing FIGS. 7 and 8, tip/tilt correction mirror 187, deformable mirror 189, wavefront sensor 197, processor 199 and their associated components are collectively referenced as beam correction system 205.

The instrument described above with reference to FIG. 6 is suitable for correction of a high power laser in industrial cutting and welding applications, and a beam correction scheme for directed-energy systems.

Figure 7:
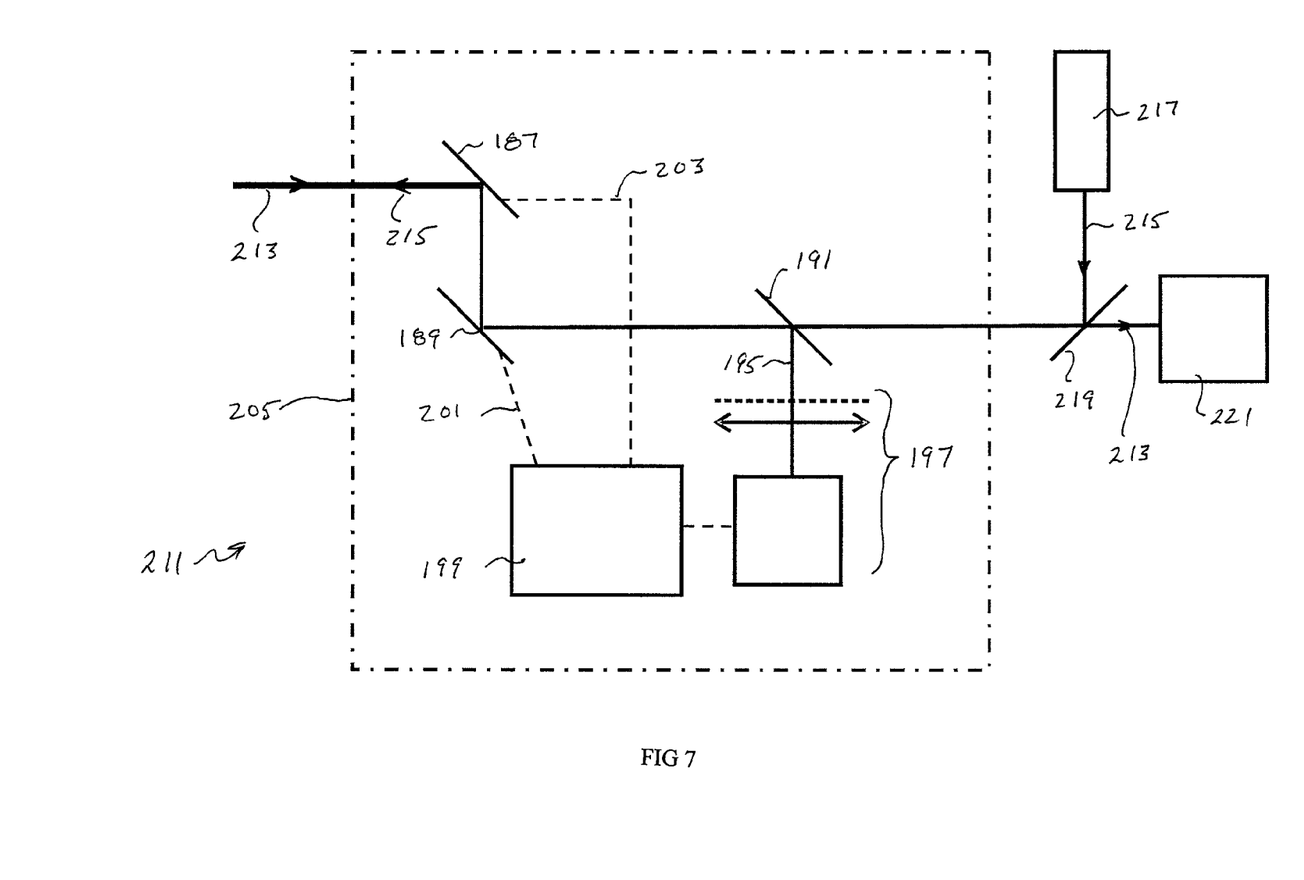
FIG. 7 shows the adaptive optic system of the present invention as applied to laser communications systems and directed energy applications.

The instrument 211 illustrated in FIG. 7 is identical to that of FIG. 6 in that it includes beam correction system 205, as described above. Beam 213 is still a laser beam, typically low power. However, for the applications listed below, instrument 211 includes a laser beam 215 from source 217 which is back-propagated through the system via beam splitter 219. With this arrangement, beam 215 is pre-distorted by deformable mirror 189 and tip/tilt mirror 187 and is then propagated through the aberrating medium (e.g., the atmosphere). Thus, when beam 215 reaches the intended object (not shown) it will be aberration-free, due to the pre-distortion of the beam. Further, the correction of beam 213 by the beam correction system 205 insures that data receiver 221 (e.g., a fast photocell) will obtain corrected images of the object (i.e., the source of beam 213). Such an instrument forms the basis of a laser communications system, and directed-energy applications.

Figure 8:
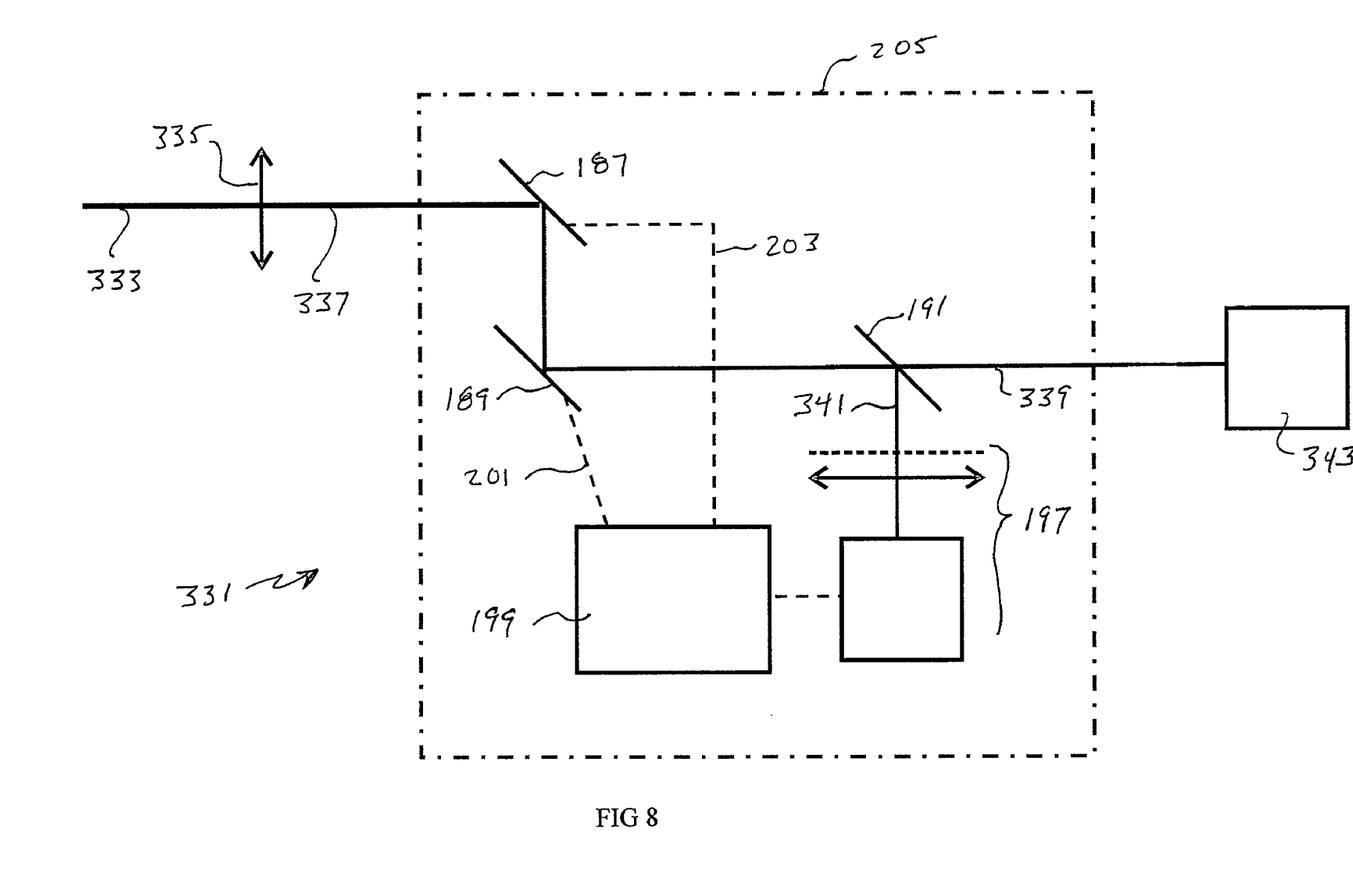
FIG. 8 shows an adaptive optic imaging system based on the principles of the present invention.

With reference to imaging instrument 331 in FIG. 8 light 333 from an object (not shown) is collected by telescope 335 to form beam 337 which is directed along the optical path of beam correction system 205. Hence, the beam reflects off tip/tilt mirror 187 and then deformable mirror 189 to correct for jitter and aberrations in the beam. Beam 337 is then divided by beam splitter 191 into beams 339 and 341. Wavefront sensor 197 (including grating 197A, lens 197B and detector 197C) samples beam 341. Wavefront sensor 197, processor 199 and their associated components function as described above to generate analog outputs 201 and 203 to drive the actuators associated with, respectively, deformable mirror 189 and tip/tilt correction mirror 187 to obtain the desired wavefront of output beam 339. This corrected beam is then directed onto an imaging detector 343, to obtain a corrected image of the object. Applications include long-range surveillance and target identification.

Figure 9:
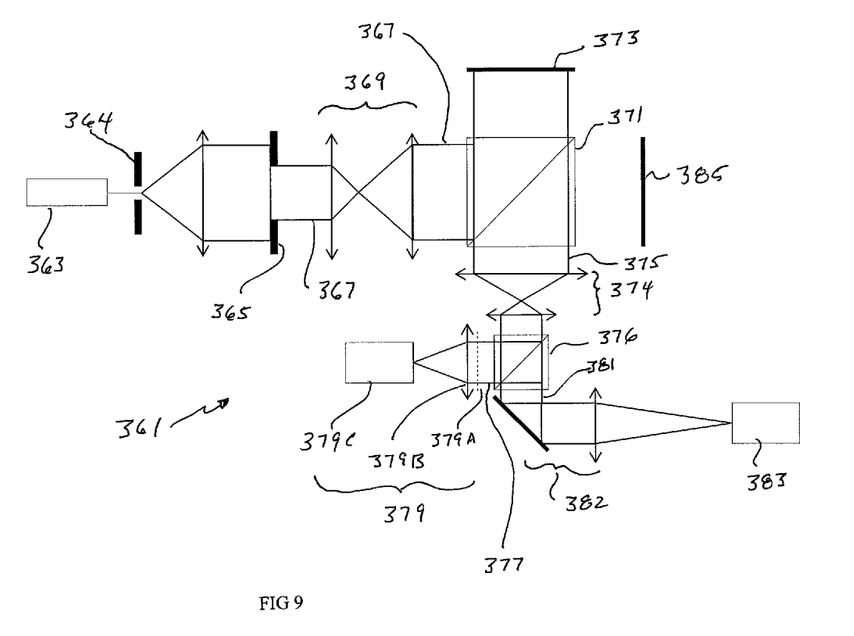
FIG. 9 shows an optical schematic of a system used to demonstrate the principles schematically illustrated in FIGS. 6 and 8.

The experimental setup 361 shown in FIG. 9 consists of laser 363 acting as a light source or object, then pinhole 364 followed by an aperture 365 to define a pupil of the system. The light 367 is then re-imaged by lens system 369 and beam splitter 371 onto deformable mirror 373. The mirror is a 20 element bimorph mirror, consisting of two piezo-electric disks with different actuator patterns, enabling large deformations (>20 μm for defocus) to be induced on the mirror surface. The light 375 from deformable mirror 373 passes through reimaging lens system 374 and is split into two parts by beam splitter 376. One beam part 377 is directed to wavefront sensor 379 which consists of a distorted phase grating 379A, lens 379B and a Dalsa CCD camera 379C. Wavefront sensor 379 is coupled to a data processor (not shown) which, in turn, uses the information from the wavefront sensor to calculate the necessary electrical signals to apply to deformable mirror 373. The other part 381 is directed, via optics 382, to an imaging sensor 383 (also referred to as a "scoring" camera) to allow for visual and quantitative analysis of the corrected light. A standard ⅔ inch CCD is used. Setup 361 also includes mirror/stop 385.

Figure 10:
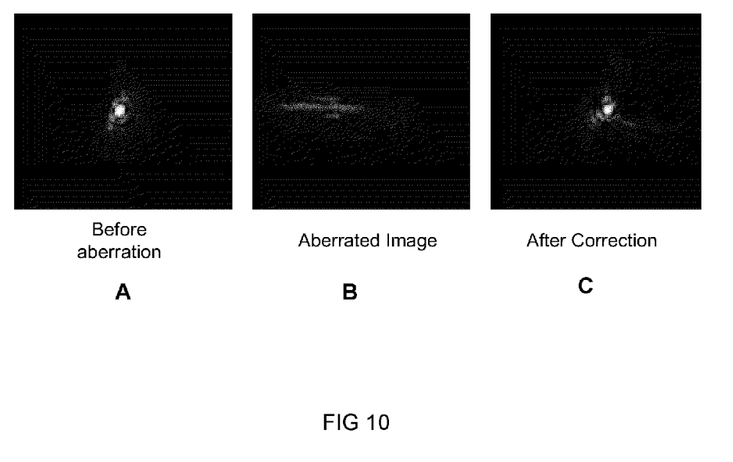
FIG. 10 is a series of images obtained from the apparatus of FIG. 9 showing the image before aberration, the aberrated image and the aberrated image after correction.
Figure 11:
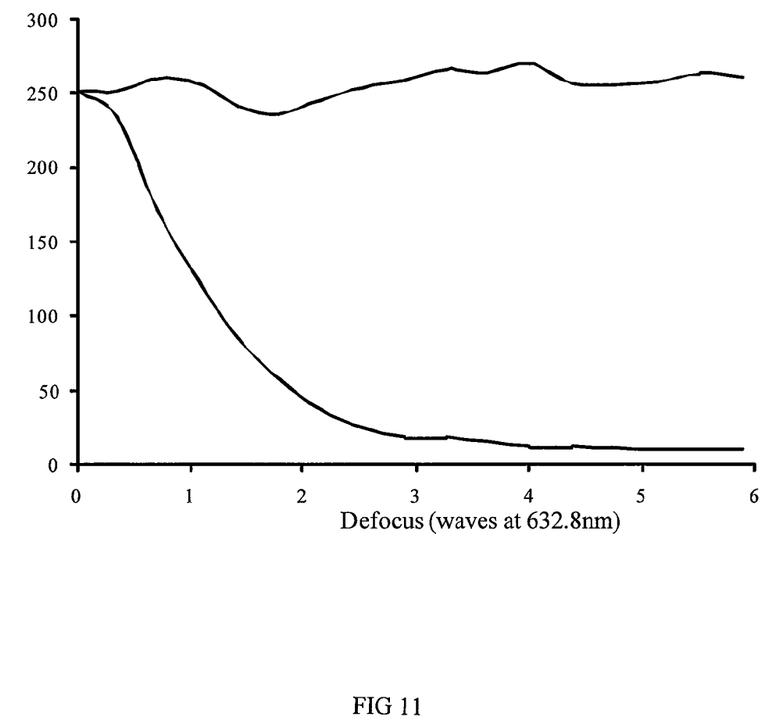
FIG. 11 is a graph of intensity vs. defocus demonstrating that large amounts of aberration were compensated by the deformable mirror of the apparatus of FIG. 9.

In operation, immediately after aperture 365 aberrations are introduced to test the correction ability of system 361. These aberrations consisted of lenses of known refractive power (not shown) and sheets of plastic with unknown aberrations (also not shown). FIG. 10.A. shows the image of light 367 (381) before any aberrations are introduced into the system. FIG. 10.B. shows the image of light 367 (381) after aberrations are introduced, but before any correction. Finally, FIG. 10.C. shows the image after correction. FIG. 11, which is a graph of intensity vs. defocus showing how, in the absence of correction, the intensity decreases as defocus increases. FIG. 11 also shows that with wavefront sensing and a deformable mirror to correct for the aberrations, the intensity remains essentially the same, despite increasing defocus.

Whereas the drawings and accompanying description have shown and described the preferred embodiment of the present invention, it should be apparent to those skilled in the art that various changes may be made in the form of the invention without affecting the scope thereof.

We claim:

1. Apparatus for determining at least some of the characteristics of the wavefront of a beam and, using such determined characteristics, to at least partially reshape such wavefront, the apparatus including:
   a. means, positioned in the beam path, for sampling the curvature of the wavefront without the need for an artificially generated reference, the curvature sampling means including means for generating outputs;
   b. means, also positioned in the beam path, for at least partially reshaping the wavefront, the wavefront reshaping means including controls responsive to inputs; and
   c. means, connected to the curvature sampling means and to the wavefront reshaping means, for (i) receiving the outputs from the curvature sampling means, (ii) proportioning the outputs from the curvature sampling means to match the inputs needed to drive the controls of the wavefront reshaping means, and (iii) sending the proportioned outputs to the wavefront reshaping means to change the shape of the wavefront reshaping means.

2. The apparatus of claim 1, wherein the wavefront reshaping means is a deformable mirror.

3. The apparatus of claim 2, wherein the deformable mirror includes a surface obeying the surface equation $\nabla 2S=aV$, wherein "S" is the surface shape of the deformable mirror, "a" is a constant, "V" are the signals applied to the controls of the deformable mirror, and $\nabla 2S$ is the change in slope of the surface of the deformable mirror.

4. The apparatus of claim 1, wherein the curvature sampling means determines at least some of the characteristics of the wavefront from features present in the beam itself.

5. The apparatus of claim 4, wherein the curvature sampling means is a wavefront sensor including a distorted grating and an associated detector, the distorted grating producing at least first and second images of the wavefront, the detector capturing such images and producing the outputs.

6. The apparatus of claim 5, wherein the curvature sampling means generates analog outputs.

7. The apparatus of claim 6, wherein the detector is selected from the group including CCDs and CMOSs.

8. The apparatus of claim 6, wherein the detector is an array of photo-detectors, the number of photo-detectors being proportional to the number of controls on the wavefront reshaping means.

9. The apparatus of claim 5, wherein the proportioning means includes means to determine the difference between the intensities of the first and second images of the wavefront.

10. The apparatus of claim 1, further including means to adjust the tip/tilt of the beam.

11. A method for determining at least some of the characteristics of the wavefront of a beam without the need for an artificially generated reference and, using such determined characteristics, to at least partially reshape such wavefront, the method including the steps of:
  a. positioning a curvature sampling device that generates outputs in the path of the beam;
  b. positioning a wavefront reshaping device that includes controls responsive to inputs in the path of the beam;
  c. connecting the curvature sampling device to the wavefront reshaping device via a means for proportioning the outputs to the inputs;
  d. sampling the curvature of the wavefront with the curvature sampling device and generating outputs representative of the curvature of the wavefront;
  e. sending the generated outputs to the proportioning means;
  f. proportioning the outputs from the curvature sampling device to match the inputs needed to drive the controls of the wavefront reshaping device; and
  g. sending the proportioned outputs to the wavefront reshaping device to change the shape of the wavefront reshaping device and, hence, the wavefront.

12. Apparatus for determining at least some of the characteristics of the wavefront of a beam, without the use of an artificially generated reference, and using the determined characteristics to at least partially reshape the wavefront, the apparatus including:
  a. means, positioned in the path of the beam, for at least partially reshaping the wavefront;
  b. a wavefront sensor also positioned along the beam path for determining at least some of the characteristics of the wavefront from features present in the beam itself, the wavefront sensor including a distorted grating and an associated detector, the distorted grating producing at least first and second images of the wavefront, the detector collecting such images producing an output from such images; and
  c. means, connected to the detector and to the wavefront reshaping means, for determining from the distorted grating images and without the use of an artificially generated reference the output necessary to adjust the wavefront reshaping means to at least partially reshape the wavefront.

13. The apparatus of claim 12, further including a beam splitter, the beam splitter positioned along the beam path for dividing the beam into first and second divided beams, the divided beams having separate paths, the wavefront sensor positioned in the path of one of the first and second divided beams.

14. The apparatus of claim 13, further including means for collecting radiation and forming the beam.

15. The apparatus of claim 14, further including an imaging sensor positioned in the path of the other of the first and second divided beams.

16. The apparatus of claim 12, wherein the determining means includes an array of photo-detectors.

17. The apparatus of claim 12, further including means, positioned on the beam path, for removing jitter from the beam.

18. A method for at least partially altering the shape of a wavefront without the use of an artificially generated reference, the method including the steps of:
  a. providing a beam of radiation, the beam having a wavefront;
  b. determining at least some of the characteristics of the wavefront from features present in the beam itself without the need to mathematically recreate the wavefront: and
  c. utilizing the determined characteristics to at least partially alter the shape of the wavefront.

* * * * *